(12) United States Patent
Okanoue et al.

(10) Patent No.: US 7,013,150 B2
(45) Date of Patent: Mar. 14, 2006

(54) POSITIONING SYSTEM, POSITIONING SERVER, BASE STATION AND TERMINAL LOCATION ESTIMATION METHOD

(75) Inventors: Kazuhiro Okanoue, Tokyo (JP); Hiroshi Furukawa, Tokyo (JP); Shuntaro Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 437 days.

(21) Appl. No.: 10/254,772

(22) Filed: Sep. 26, 2002

(65) Prior Publication Data
US 2003/0064733 A1 Apr. 3, 2003

(30) Foreign Application Priority Data
Oct. 3, 2001 (JP) ............................ 2001-307008

(51) Int. Cl.
*H04Q 7/20* (2006.01)
(52) U.S. Cl. .............................. 455/456.1; 455/456.2; 455/456.3; 455/456.5; 455/457; 455/414.2; 455/456.6; 701/207; 701/214; 340/988; 342/450
(58) Field of Classification Search ............ 455/67.16, 455/456.1, 456.2, 456.3, 456.5, 456.6, 457, 455/404.2, 414.2; 701/207, 214, 216; 340/988; 342/357.1, 357.06, 357.12, 450
See application file for complete search history.

(56) References Cited

U.S. PATENT DOCUMENTS 5,564,079 A * 10/1996 Olsson .................... 455/456.3
6,070,083 A * 5/2000 Watters et al. .............. 455/517
6,084,547 A * 7/2000 Sanderford et al. .......... 342/457
6,108,555 A * 8/2000 Maloney et al. .......... 455/456.2
6,442,392 B1 * 8/2002 Ruutu et al. ............. 455/456.1
6,662,016 B1 * 12/2003 Buckham et al. ........... 455/457
6,681,099 B1 * 1/2004 Keranen et al. .......... 455/67.16

FOREIGN PATENT DOCUMENTS

JP          11-275632 A       10/1999

OTHER PUBLICATIONS

J.W. McKown et al., "Ray Tracing as a Design Tool for Radio Networks," *IEEE Network Magazine* Nov. 1991, 5(6):27-30.

* cited by examiner

*Primary Examiner*—Stephen M. D'Agosta
(74) *Attorney, Agent, or Firm*—Foley & Lardner LLP (57) ABSTRACT

To provide a terminal location estimation method capable of accurately estimating a location of a mobile terminal when providing information services according to the location of the terminal in a radio communication system. A positioning server sends a location measurement probe message to the mobile terminal in order to measure the location of the terminal. Each of base stations receives a response message broadcasted from the terminal, measures the reception level and delay spread and sends the measurement results to the positioning server. The positioning server has a radio wave propagation estimating portion and a database for storing estimation results thereof. The server estimates the location of the terminal by checking the measurement results of the base stations against the estimation results on radio wave propagation stored in the database.

11 Claims, 10 Drawing Sheets

| VERTICAL \ HORIZONTAL | 1 | | | | 2 | | | |
|---|---|---|---|---|---|---|---|---|
| | BASE STATION No. | EXISTENCE DETERMINATION | RECEPTION LEVEL DIFFERENCE | DELAY SPREAD DIFFERENCE | BASE STATION No. | EXISTENCE DETERMINATION | RECEPTION LEVEL DIFFERENCE | DELAY SPREAD DIFFERENCE |
| 1 | BASE STATION #1 | 1 | 2dB | 10 MICROSECONDS | BASE STATION #1 | 1 | -2dB | -10 MICROSECONDS |
| | BASE STATION #2 | 0 | -20dB | 50 MICROSECONDS | BASE STATION #2 | 1 | 3dB | -20 MICROSECONDS |
| | BASE STATION #3 | 0 | -1dB | 100 MICROSECONDS | BASE STATION #3 | 0 | -30dB | -2 MICROSECONDS |
| | BASE STATION No. | EXISTENCE DETERMINATION | RECEPTION LEVEL DIFFERENCE | DELAY SPREAD DIFFERENCE | BASE STATION No. | EXISTENCE DETERMINATION | RECEPTION LEVEL DIFFERENCE | DELAY SPREAD DIFFERENCE |
| 2 | BASE STATION #1 | 0 | 20dB | 5 MICROSECONDS | BASE STATION #1 | 1 | 2dB | 10 MICROSECONDS |
| | BASE STATION #2 | 0 | -30dB | -2 MICROSECONDS | BASE STATION #2 | 1 | -2dB | -10 MICROSECONDS |
| | BASE STATION #3 | 999 | 999 | 999 | BASE STATION #3 | 1 | 3dB | -20 MICROSECONDS |
| ... | | | | | | | | |

POSITIONING SYSTEM, POSITIONING SERVER, BASE STATION AND TERMINAL LOCATION ESTIMATION METHOD

BACKGROUND OF THE INVENTION

1. Field of the Invention

The present invention relates to a positioning system, a positioning server, a base station and a terminal location estimation method, and in particular, to a method of easily and accurately detecting a location of a mobile terminal for utilizing a radio communication system.

2. Description of the Prior Art

In recent years, as represented by a portable telephone, services in keeping with a location at which a user exists are provided by utilizing a radio communication system, and these services are generally called location information services.

Figure 9:
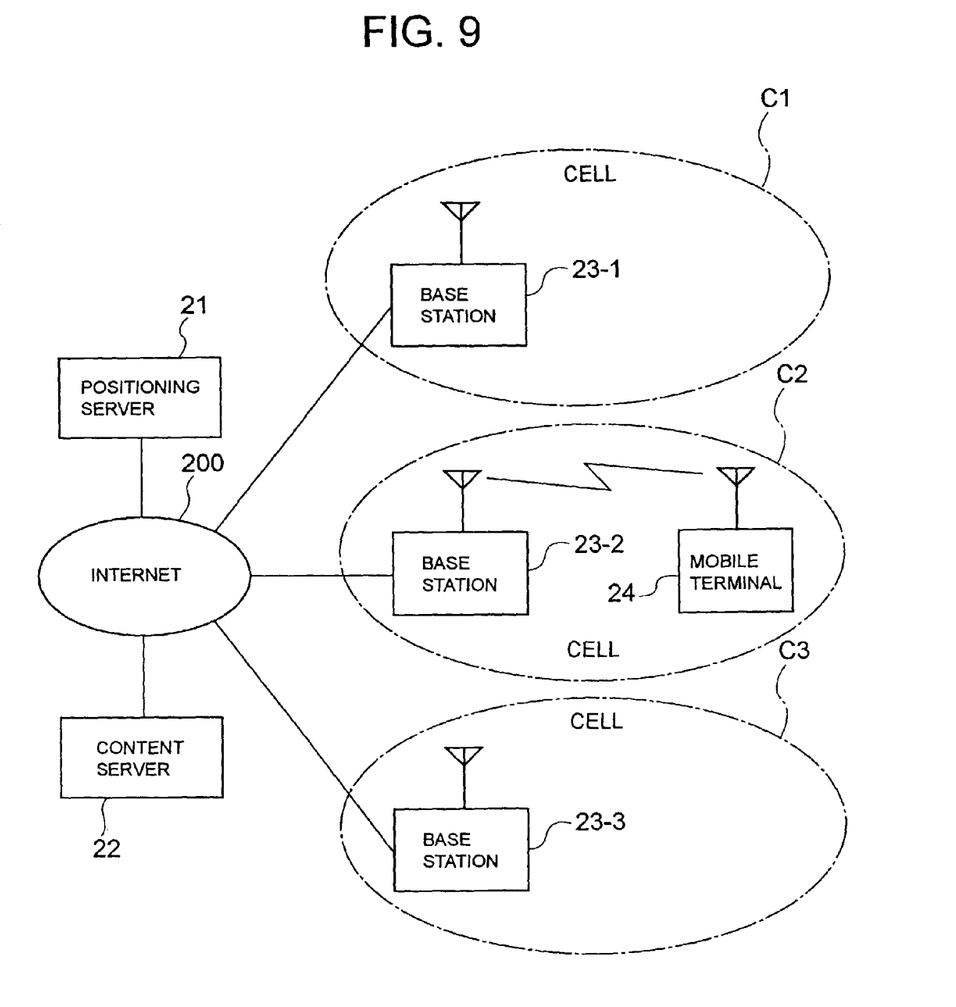
FIG. 9 is a block diagram showing an example of a configuration of a positioning system in the past.

An example of the location information services will be described by using FIGS. 9 and 10. FIG. 9 is a block diagram showing an example of a configuration of a positioning system in the past. In FIG. 9, reference numeral 21 denotes a positioning server, 200 denotes the Internet, 22 denotes a content server, 23-1 to 23-3 denote base stations, C-1 to C-3 denote cells covered by the base stations 23-1 to 23-3, and 24 denotes a mobile terminal.

The mobile terminal 24 exists in the cell C2, and performs communication with the positioning server 21 and the content server 22 on the Internet 200 via the base station 23-2.

Figure 10:
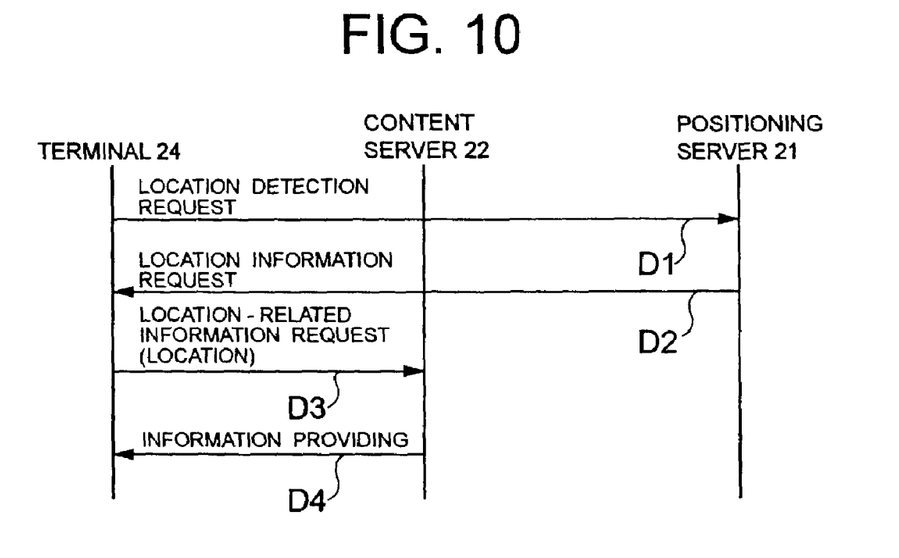
FIG. 10 is a sequence chart showing an operation example of the system shown in FIG. 9.

In the case where a user of the terminal 24 obtains information in keeping with an existing location of the terminal 24 (location-related information) such as information on restaurants in the vicinity, a procedure shown in FIG. 10 is applicable, for instance. As shown in FIG. 10, the terminal 24 first sends a location detection request message D1 to the positioning server 21. On receipt of the message D1, the positioning server 21 measures the location of the terminal 24 and sends a location information response message D2 including the location of the terminal 24 to the terminal 24.

As for the location of the terminal 24, it may be the location of the base station to which the terminal 24 is connected, or latitude and longitude at which the terminal 24 exists. The terminal 24 sends a location-related information request message D3 including the location obtained from the positioning server 21 to the content server 22. The content server 22 provides requested information D4 to the terminal 24 based on the request message D3.

In the case of using the location of the base station to which the terminal 24 is connected as the location of the terminal 24, it is rather easy to implement the location information services, and yet the only available accuracy of the location of the terminal 24 is resolution per base station.

As a method of improving the accuracy of the location of the terminal 24, use of a positioning-specific system represented by GPS (Global Positioning System) is known. It is possible, by this method, to obtain detailed information such as latitude and longitude of a terminal location. However, facilities for using the positioning-specific system will be required.

Japanese Patent Application Laid-Open No. 11-275632 shows a method of improving the resolution of the terminal location without using a system such as the GPS. By this method, the terminal measures electric field strengths of the radio waves transmitted from a plurality of base stations, and sends the measurement results to the positioning server having an electric field strength database and a base station database, where the positioning server checks values stored in the above-mentioned databases against the measurement results so as to output the terminal location at a resolution smaller than per base station.

Figure 11:
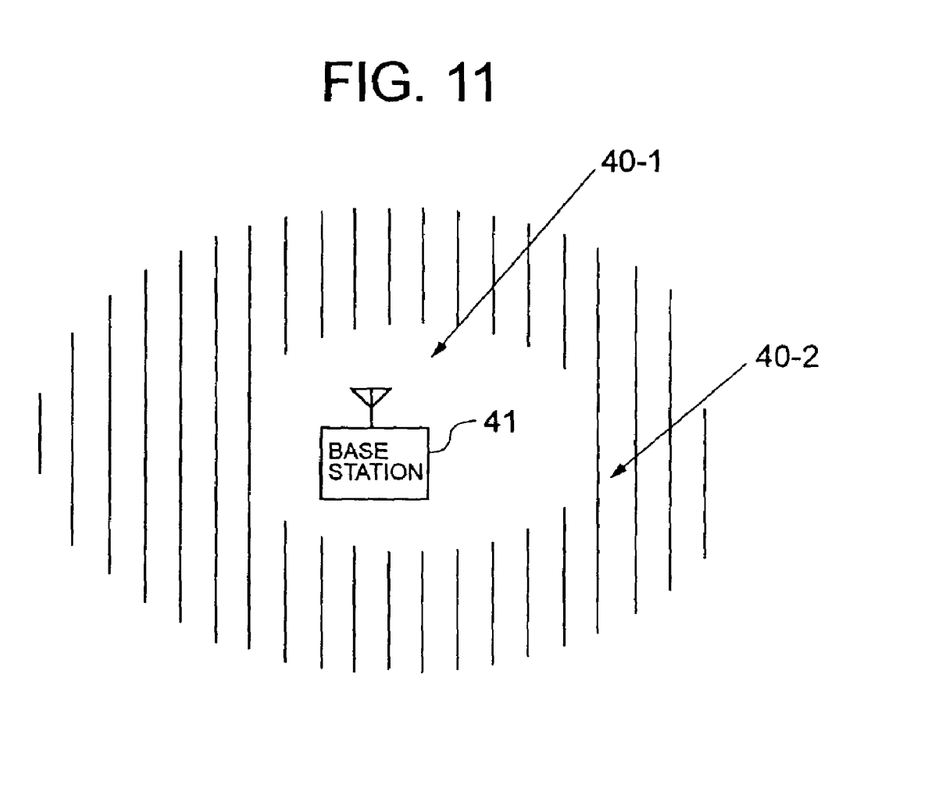
FIG. 11 is a diagram for explaining a terminal location estimation method in the past.

According to the terminal location estimation method shown in Japanese Patent Application Laid-Open No. 11-275632, the location of the terminal to be estimated depends on accuracy of electric field strength measurement of the terminal. As shown in FIG. 11, an area estimated to be equal in the electric field strength of the radio wave transmitted from a base station often becomes a plane instead of a point. In FIG. 11, reference numeral 41 denotes the base station, and 40-1 and 40-2 denote the areas determined to be equal in the electric field strength of the radio wave transmitted from the base station 41 respectively.

For instance, if the area 40-2 is the area which is measured as the electric field strength of the radio wave transmitted from the base station 41=X, it can be determined that the terminal on which the electric field strength of the received radio wave from the base station 41 is measured as X exists in the area 40-2.

The terminal measures the electric field strengths of the received radio waves from a plurality of base stations, and the positioning server estimates the areas in which the terminal exists based on the measurement results and takes the product of the estimated areas. Therefore, the location of the terminal can be estimated at a higher resolution. There is a problem, however, that an resolution of the estimated terminal location becomes rough in the case of a small number of base stations.

In addition, as the terminal measures the electric field strengths of received radio waves from a plurality of base stations, there is a possibility that the measurement may take time and the terminal may move during the measurement in the case where the terminal has only one apparatus for measuring the electric field strength. Although the measurement time can be shortened if the terminal has a plurality of measuring apparatuses, there is a possibility that having the plurality of measuring apparatuses may have an impact on the size, cost and power consumption of the terminal.

SUMMARY OF THE INVENTION

An object of the present invention is to provide a positioning system, a positioning server, a base station and a terminal location estimation method capable of accurately estimating the location of a mobile terminal when providing the information services according to the location of the mobile terminal in a radio communication system.

According to the first aspect of the present invention, a positioning system having:

a positioning server for estimating a location of a mobile terminal in a service area comprised of a plurality of preset areas; and a plurality of base stations connectable to the above described terminal via radio links and connected to the above described positioning server via a network, wherein:

each of the above described base stations has receiving means for receiving a signal transmitted from the above described terminal, measuring means for measuring a radio wave propagation environment between the above described terminal and the base station from the signal received by the above described receiving means, and means for sending the measurement result of the above described measuring means to the above described positioning server; and the above described positioning server has storing means for storing a estimation result of the radio wave propagation environment between each of the above described preset areas and each of the above described base stations, and estimating means for estimating the location of the above described terminal by checking the above described estimation results stored in the above described storing means against the above described measurement results from the above described base stations.

The above described estimation results contain reception levels and impulse responses in the above described preset areas of radio waves transmitted from the above described base stations.

Or the above described estimation results contain reception levels and delay spreads in the above described preset areas of radio waves transmitted from the above described base stations.

The above described positioning server has estimating means for estimating the radio wave propagation environment between each of the above described preset areas and each of the above described base stations based on at least the location of each of the above described base stations and placement of structures in the above described service area.

According to the second aspect of the present invention, a positioning server connected via a network to a plurality of base stations connectable to a mobile terminal via radio links for estimating a location of the above described terminal in a service area comprised of a plurality of preset areas, wherein:

the above described positioning server has storing means for storing a estimation result of a radio wave propagation environment between each of the above described preset areas and each of the above described base stations, and estimating means for estimating the location of the above described terminal by checking the above described estimation results stored in the above described storing means against the radio wave propagation environment between the above described terminal and each of the above described base stations measured by each of the above described base stations.

According to the third aspect of the present invention, a base station connectable to a mobile terminal via a radio link and connected via a network to a positioning server for estimating a location of the above described terminal in a service area comprised of a plurality of preset areas, wherein:

the above described base station has a first radio system comprised of a transmitting and receiving portion for performing communication with the above described terminal, and a second radio system comprised of a receiving portion for receiving a signal transmitted from the above described terminal based on information obtained from the above described positioning server.

According to the fourth aspect of the present invention, a terminal location estimation method of a positioning system having a positioning server for estimating a location of a mobile terminal in a service area comprised of a plurality of preset areas, and a plurality of base stations connectable to the above described terminal via radio links and connected to the above described positioning server via a network, wherein:

each of the above described base stations has a step of measuring a radio wave propagation environment between the above described terminal and the base station based on a received signal from the above described terminal according to a request from the above described terminal and sending the measurement result to the above described positioning server; and the above described positioning server has an estimating step of estimating the location of the above described terminal by checking estimation results stored in storing means for storing the estimation result of the radio wave propagation environment between each of the above described preset areas and each of the above described base stations against the above described measurement results from the above described base stations.

The above described estimating step estimates which of the above described preset areas the above described terminal exists in based on results of checking the above described estimation results against the above described measurement results.

The above described estimating step estimates which of the above described preset areas the above described terminal exists in by evaluating whether or not each of the above described results of checking meets an existence condition set on initialization.

A difference between the above described estimation result and the above described measurement result is used as the above described existence condition.

A radio wave propagation environment between a transmitting point and receiving point connected by a radio link can be modeled with a linear filter, and can be completely described by acquiring amplitude characteristics and phase characteristics (delay characteristics) thereof.

According to Japanese Patent Application Laid-Open No. 11-275632, electric field strength of a received radio wave measured by the terminal is given from the transmitting power and the amplitude characteristics showing attenuation from the transmitting point to the receiving point, and no information on the phase characteristics is used. According to the present invention, it becomes possible, by using the amplitude characteristics concurrently with the phase characteristics, to detect the location at which the terminal exists more accurately. To be more specific, the phase characteristics (delay characteristics) are reliable information for the purpose of discriminating between the receiving points which are almost equal in the electric field strength of the radio wave transmitted from the transmitting point.

In addition, as radio wave propagation characteristics are the same even if the transmitting point and receiving point are replaced, the results of having the radio wave propagation environment measured by the terminal based on the radio wave transmitted from each of the base stations and the results of having the radio wave propagation environment measured by each of the base stations based on the radio wave transmitted from the terminal are equal. Accordingly, it is possible to shorten the estimation time and suppress the impact of the terminal movement by having the radio wave propagation environment measured by each of the base stations based on the radio wave transmitted from the terminal and estimating the terminal location based on the measurement results.

DETAILED DESCRIPTION OF THE PREFERRED EMBODIMENTS

Figure 1:
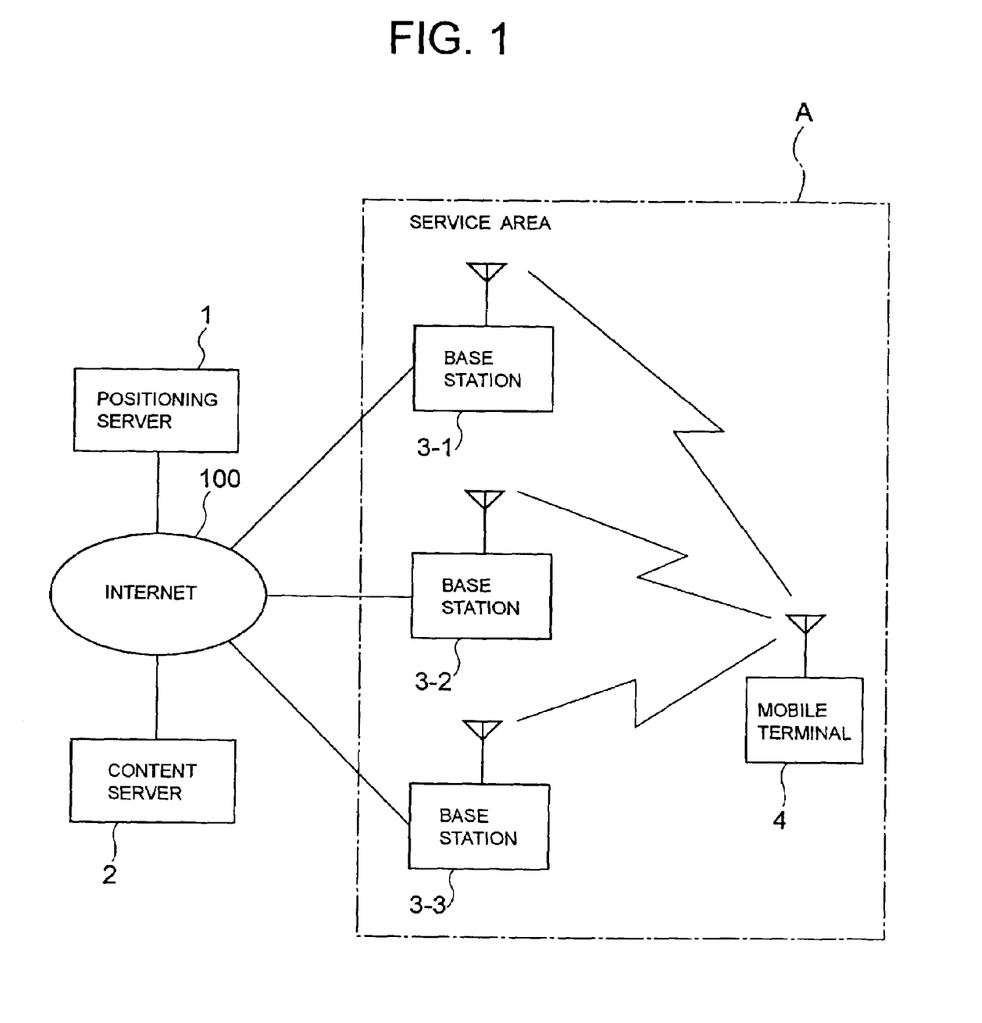
FIG. 1 is a block diagram showing a configuration of a positioning system according to an embodiment of the present invention.

Next, an embodiment of the present invention will be described by referring to the drawings. FIG. 1 is a block diagram showing a configuration of a positioning system according to an embodiment of the present invention. In FIG. 1, reference symbol A represents a service area, reference numeral 1 denotes a positioning server, 2 denotes a content server, 3-1 to 3—3 denote base stations, 4 denotes a mobile terminal, and 100 denotes the Internet.

The positioning server 1, the content server 2 and the base stations 3-1 to 3—3 are connected to the Internet 100 respectively, and are capable of performing mutual communication. The mobile terminal 4 can obtain the information accumulated in the content server 2 via the base station 3-1, 3-2, 3—3.

The service area A is a range capable of radio communication by the base stations 3-1 to 3—3, and the terminal 4 performs the communication only in the service area A. That is, the base stations 3-1 to 3—3 provide the terminal 4 in the service area A with the radio communication services. The service area A is divided into small areas according to a resolution for estimating the location of the terminal 4. The divided areas are location estimation unit areas.

Figure 2:
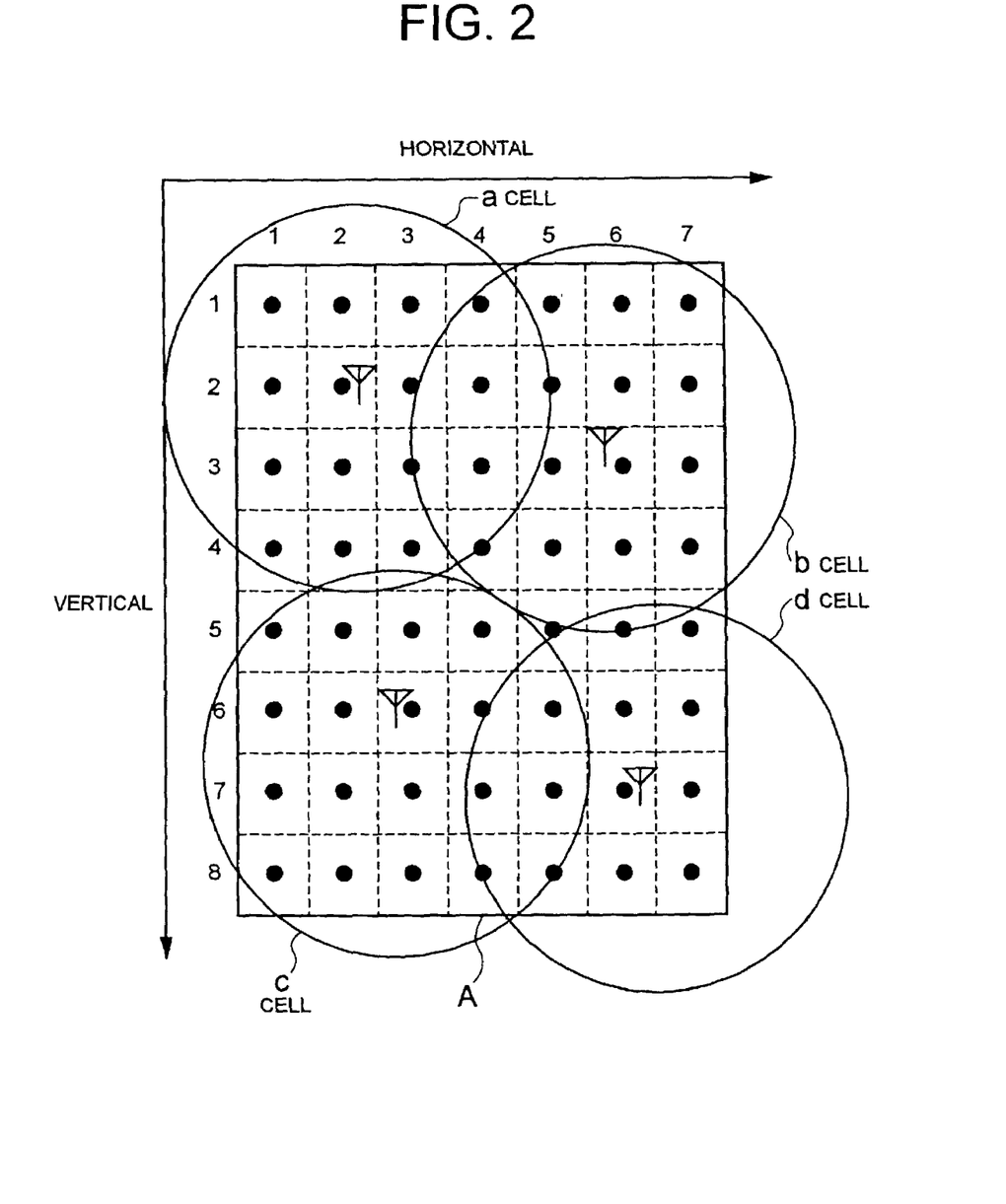
FIG. 2 is a diagram showing an example of division of the service area shown in FIG. 1.

FIG. 2 is a diagram showing an example of division of the service area A shown in FIG. 1. In FIG. 2, the service area A is divided into a square grid. While the location estimation unit areas are almost in the same shape in this example of division, it is also possible to divide it into the location estimation unit areas in different shapes.

In addition, while the example of division shown in FIG. 2 has a two-dimensional plane divided, it is also possible to define the location estimation unit areas as three-dimensional space in consideration of a height direction. In this embodiment, the service area A is divided into a square grid as shown in FIG. 2 to be horizontally and vertically numbered so as to identify each location estimation unit area in the form of (horizontal number, vertical number).

Here, the size of the location estimation unit area is determined by degree of accuracy with which the location of the terminal 4 is estimated against the entire service area A. In the case of estimating the location of the terminal 4 with high accuracy, the size of each location estimation unit area is rendered smaller, and in the case where rough estimation is sufficient, it is rendered larger.

On the other hand, the base stations 3-1 to 3—3 (indicated by antennas in FIG. 2) are placed to cover the entire service area A irrespective of the above location estimation unit areas. When placing the base stations 3-1 to 3—3, they are placed irrespective of the location estimation unit areas while limited by a building structure, placement of utensils and so on. The base station 3-1, 3-2, 3—3 is connected by a radio link to the terminal 4 placed in a cell a, b, c, d covered by the base station.

As opposed to this, in the case where the base stations 3-1 to 3—3 are already placed, it is also possible to set the service area A so that it can be covered thereby and to divide the service area A into the location estimation unit areas.

Figure 3:
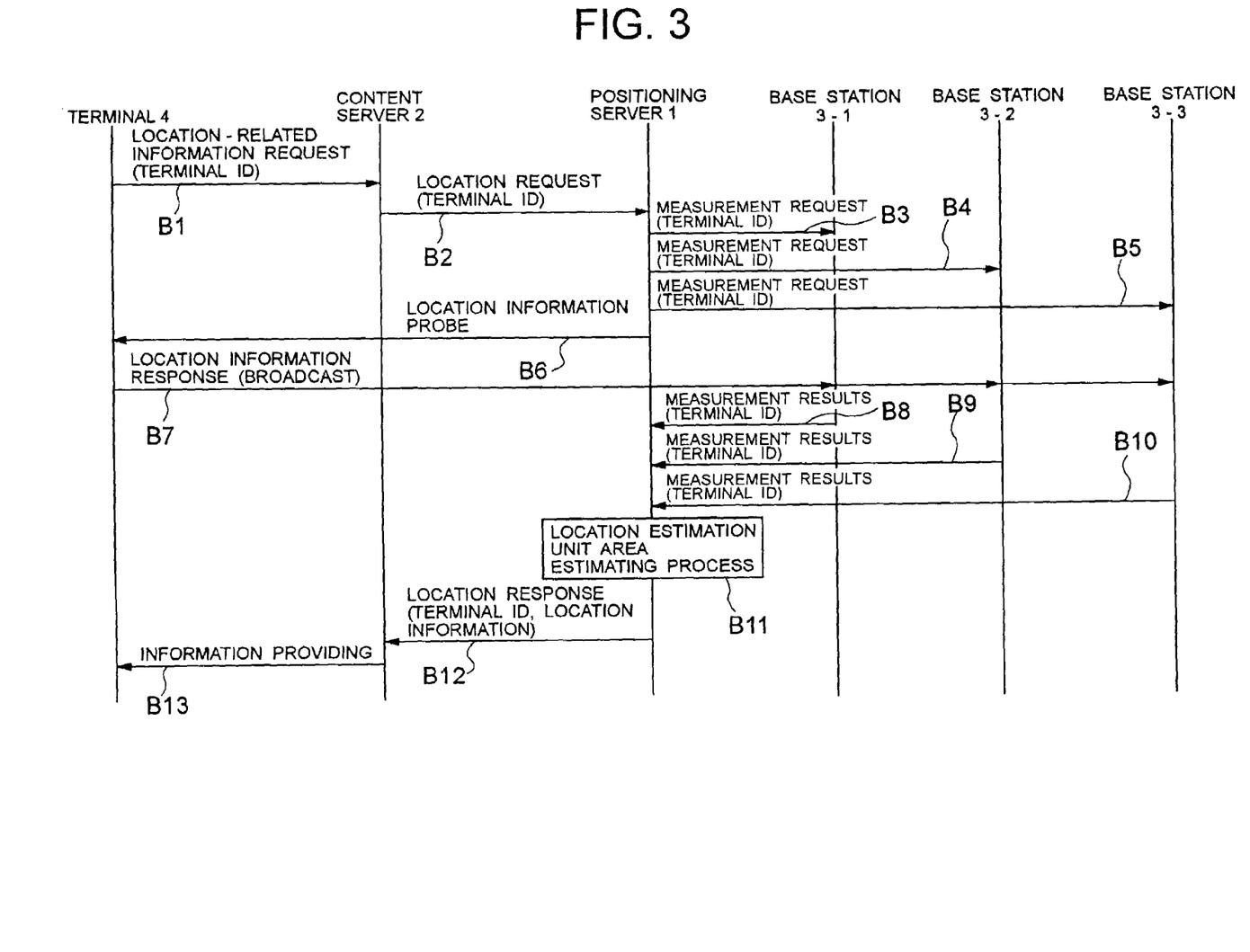
FIG. 3 is a sequence chart showing operation of the positioning system according to the embodiment of the present invention.

FIG. 3 is a sequence chart showing operation of the positioning system according to the embodiment of the present invention. A procedure whereby the terminal 4 obtains the information related to its location from the content server 2 will be described by referring to FIGS. 1 to 3.

When a user of the terminal 4 needs the information related to its location, the user operates the terminal 4. Then, the terminal 4 sends a location-related information request message B1 including a terminal identifier (hereafter, a terminal ID) to the content server 2. The content server 2 sends a location request message B2 including the terminal ID to the positioning server 1 so as to request the location of the terminal 4 identified by the terminal ID.

On receipt of this message B2, the positioning server 1 sends measurement request messages B3 to B5 including the terminal ID to the base stations 3-1 to 3—3. Each of the base stations 3-1 to 3—3 having received the messages B3 to B5 performs preparations such as adjustment of frequencies, for instance, to be able to receive a signal from the terminal 4 identified by the terminal ID. Furthermore, the positioning server 1 sends location information probe message B6 to the terminal 4.

On receipt of the location information probe message B6, the terminal 4 transmits a location information response message B7 as a broadcast message. In the process of receiving the location information response message B7 transmitted from the terminal 4, each of the base stations 3-1 to 3—3 measures a reception level of the received signal and a channel impulse response, and sends the measurement results to the positioning server 1 as a measurement result message B8, B9, B10 together with the terminal ID.

The positioning server 1 performs a location estimation unit area estimating process B11 based on the measurement results from the base stations 3-1 to 3—3, and sends to the content server 2 a location response message B12 including the location estimation unit area estimated to have the terminal 4 existing therein and the terminal ID as a response to the location request message B2. On obtaining the location estimation unit area included in the location response message B12 as the location at which the terminal 4 exists, the content server 2 sends to the terminal 4 information B13 according to the location as a response to the location-related information request message B1.

Moreover, while the location-related information request message B1, the location information probe message B6 and the information providing message B13 are transferred via the base station 3-1, 3-2, 3—3 to which the terminal 4 is connected, a relay by the base station 3-1, 3-2, 3—3 is omitted in FIG. 3 in order to clarify information flow.

Figure 4:
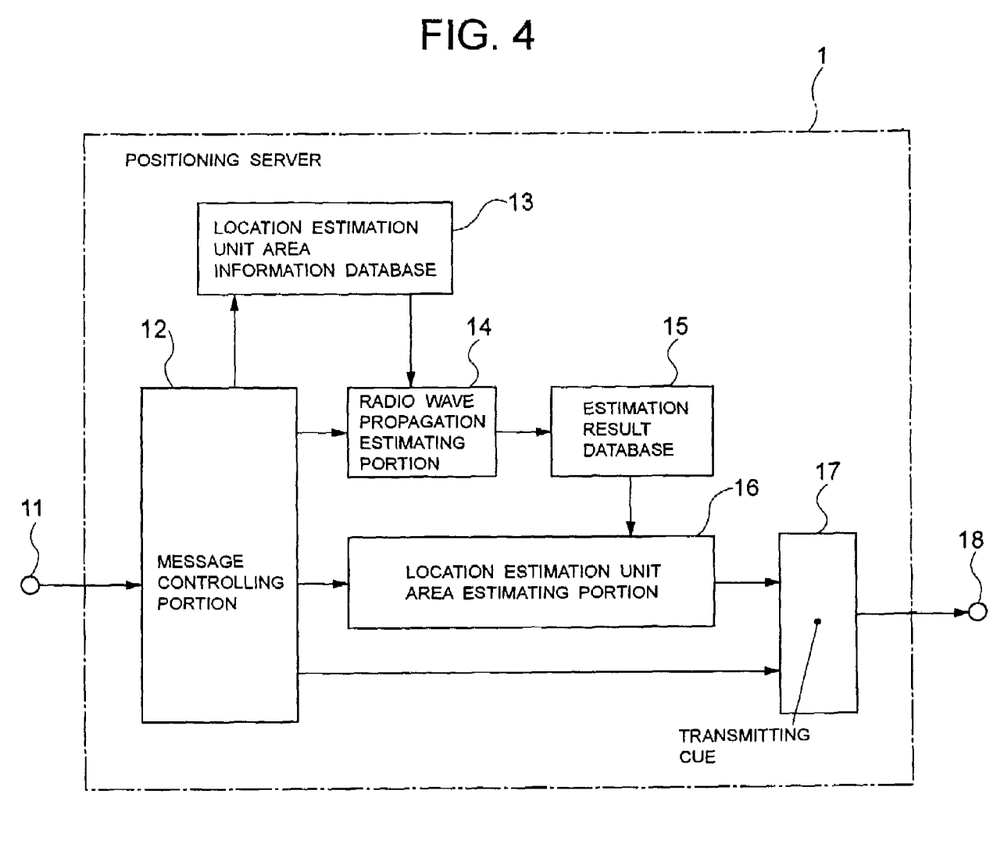
FIG. 4 is a block diagram showing a configuration example of the positioning server shown in FIG. 1.

FIG. 4 is a block diagram showing a configuration example of the positioning server 1 shown in FIG. 1. In FIG. 4, reference numeral 11 denotes an input terminal, 12 denotes a message controlling portion, 13 denotes a location estimation unit area information database, 14 denotes a radio wave propagation estimating portion, 15 denotes an estimation result database, 16 denotes a location estimation unit area estimating portion, 17 denotes a transmitting cue, and 18 denotes an output terminal respectively.

Control messages to the positioning server 1 are inputted from the input terminal 11. The control messages also include those inputted via the Internet 100 and those inputted from an apparatus directly connected to the positioning server 1 such as a keyboard which is not shown.

As for the control messages, there are the location request message, the measurement result message, a database update message and so on for instance. The location request message includes the terminal ID and is a positioning request of the location of the terminal 4 identified by the terminal ID. The measurement result message includes the terminal ID and information (a transmit frequency of the terminal 4 and so on) measured by the base station 3-1, 3-2, 3—3 and necessary for estimating the terminal location. The database update message indicates a change in the location estimation unit area information and is the message for updating the estimation result database 15. The location estimation unit area information contains the locations of the base stations 3-1 to 3—3, the locations of newly installed base stations and information on structures such as the buildings and utensils in the service area A.

The operation of the positioning server 1 is controlled according to the message inputted via the input terminal 11. To be more specific, the message controlling portion 12 performs input control on the location request message, input control on the measurement result message, update control on the location estimation unit area information database 13, and update control on the estimation result database 15.

The input control on the location request message is the control for generating the measurement request message including the terminal ID and sending it to the base stations 3-1 to 3—3 via the transmitting cue 17 and the output terminal 18. The input control on the measurement result message is the control for transferring the measurement result included in this message to the location estimation unit area estimating portion 16, estimating the location of the terminal 4 identified by the terminal ID, and sending the estimation result to the content server 2 via the transmitting cue 17 and the output terminal 18.

The update control on the location estimation unit area information database 13 is the control for updating the location estimation unit area information database 13 when changes in the location estimation unit area information arise such as the location of a newly installed base station and changes in the structures in the service area A. The update control on the estimation result database 15 is the control for, when the location estimation unit area information database 13 is updated, updating the estimation result database 15 with a radio wave propagation situation estimated by the radio wave propagation estimating portion 14 based on the location estimation unit area information.

The radio wave propagation estimating portion 14 estimates parameters such as received signal levels and delay spreads in each location estimation unit area of radio waves transmitted from the base stations 3-1 to 3—3, according to a predetermined algorithm, based on the location estimation unit area information accumulated in the location estimation unit area information database 13, and outputs the estimated parameters to the estimation result database 15.

Here, algorithms used in the radio wave propagation estimating portion 14 include a ray tracing method shown in John W. McKown and R. Lee Hamilton, Kr., "Ray Tracing as a Design Tool for Radio Networks" (IEEE Network Magazine, pp. 27 to 30, November 1991) for instance.

It is possible, by the ray tracing method, to approximate the radio wave transmitted from the transmitting point to a plurality of rays and predict propagation loss from the transmitting point to the receiving point and delay time of a delay wave which reaches the receiving point in consideration of reflection, diffraction and so on for the propagation of each ray. Thus, the radio wave propagation estimating portion 14 uses the ray tracing method to consider the impact of the structures constituting the propagation environment such as the buildings and utensils on the radio wave transmitted from each base station so as to estimate the received signal levels, delay spreads and so on which are the parameters showing the propagation environment in each location estimation unit area in the service area A shown in FIG. 2 and output them to the estimation result database 15.

The estimation result database 15 stores the estimation results estimated by the radio wave propagation estimating portion 14 such as the received signal levels and delay spreads in each location estimation unit area in the service area A.

Moreover, in this embodiment, while the location estimation unit area information which contains the information on the structures such as the buildings and utensils, the locations of the base stations 3-1 to 3—3 and so on is accumulated in the location estimation unit area information database 13, it is also possible to describe the location estimation unit area information in the message inputted to the message controlling portion 12 which directly inputs it to the radio wave propagation estimating portion 14, and in this case, the location estimation unit area information database 13 is no longer necessary.

Figure 5:
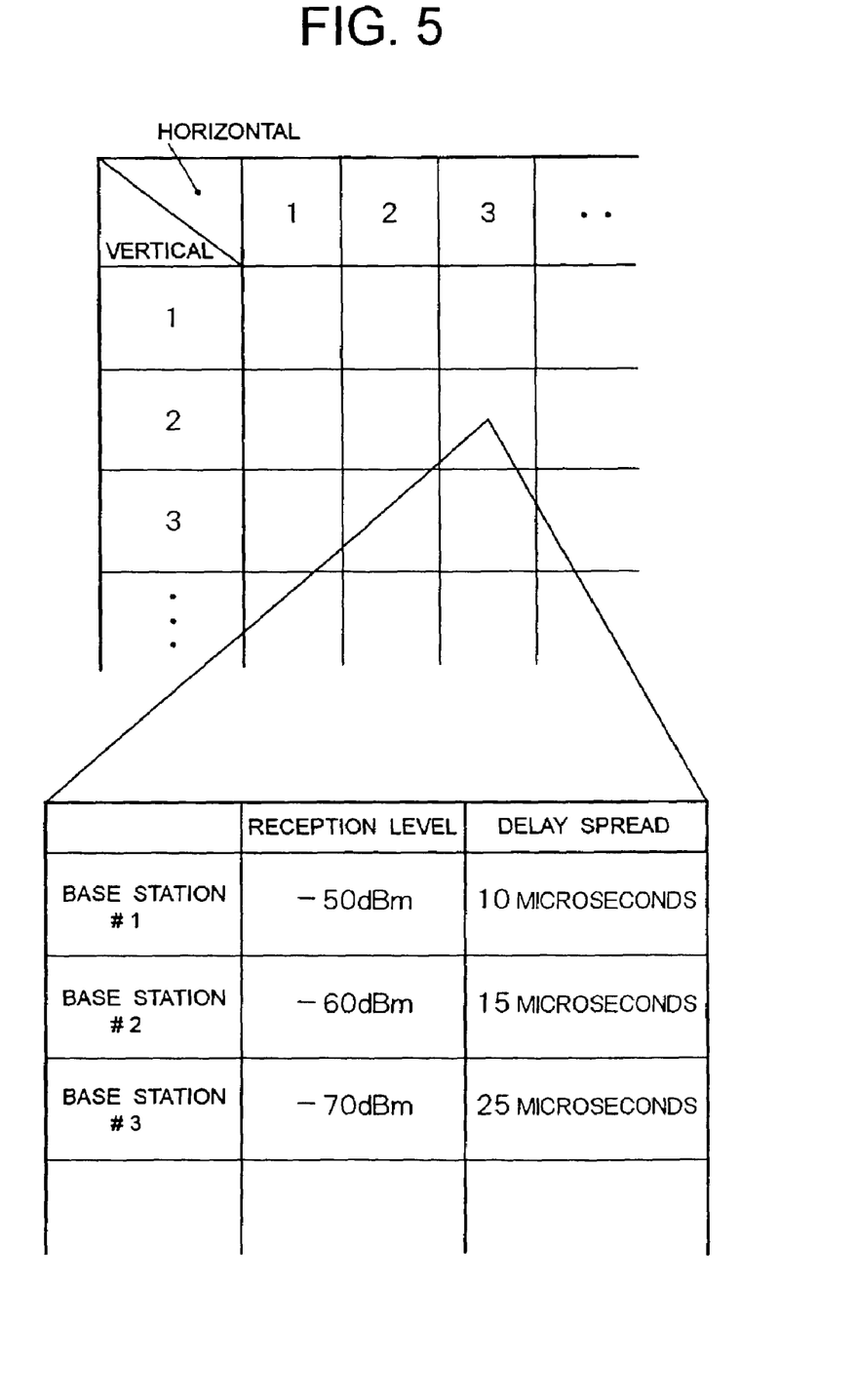
FIG. 5 is a diagram showing the contents stored in the database shown in FIG. 4.

FIG. 5 is a diagram showing the contents stored in the estimation result database 15 shown in FIG. 4. In FIG. 5, the estimation result database 15 manages a table showing each location estimation unit area in the service area A with vertical and horizontal numbers, and stores the estimation results such as the received signal level (reception level) and delay spread in each location estimation unit area of the radio wave transmitted from each base station. Moreover, while this table shows an example of three base stations #1 to #3, it is also possible to increase the number of the base stations to be stored.

In FIG. 5, the location estimation unit area identified by (vertical=2, horizontal=3) has the estimation results on the base stations #1 to #3, that is, the base station #1 (reception level—50 dBm, delay spread 10 microseconds), base station #2 (reception level—60 dBm, delay spread 15 microseconds) and base station #3 (reception level—70 dBm, delay spread 25 microseconds) stored therein.

On having the measurement results included in the measurement result message sent from each of the base stations 3-1 to 3—3 inputted, the location estimation unit area estimating portion 16 compares these measurement results to the estimation results on the base station managed by the table of the estimation result database 15 so as to estimate the location of the terminal 4.

Figure 6:
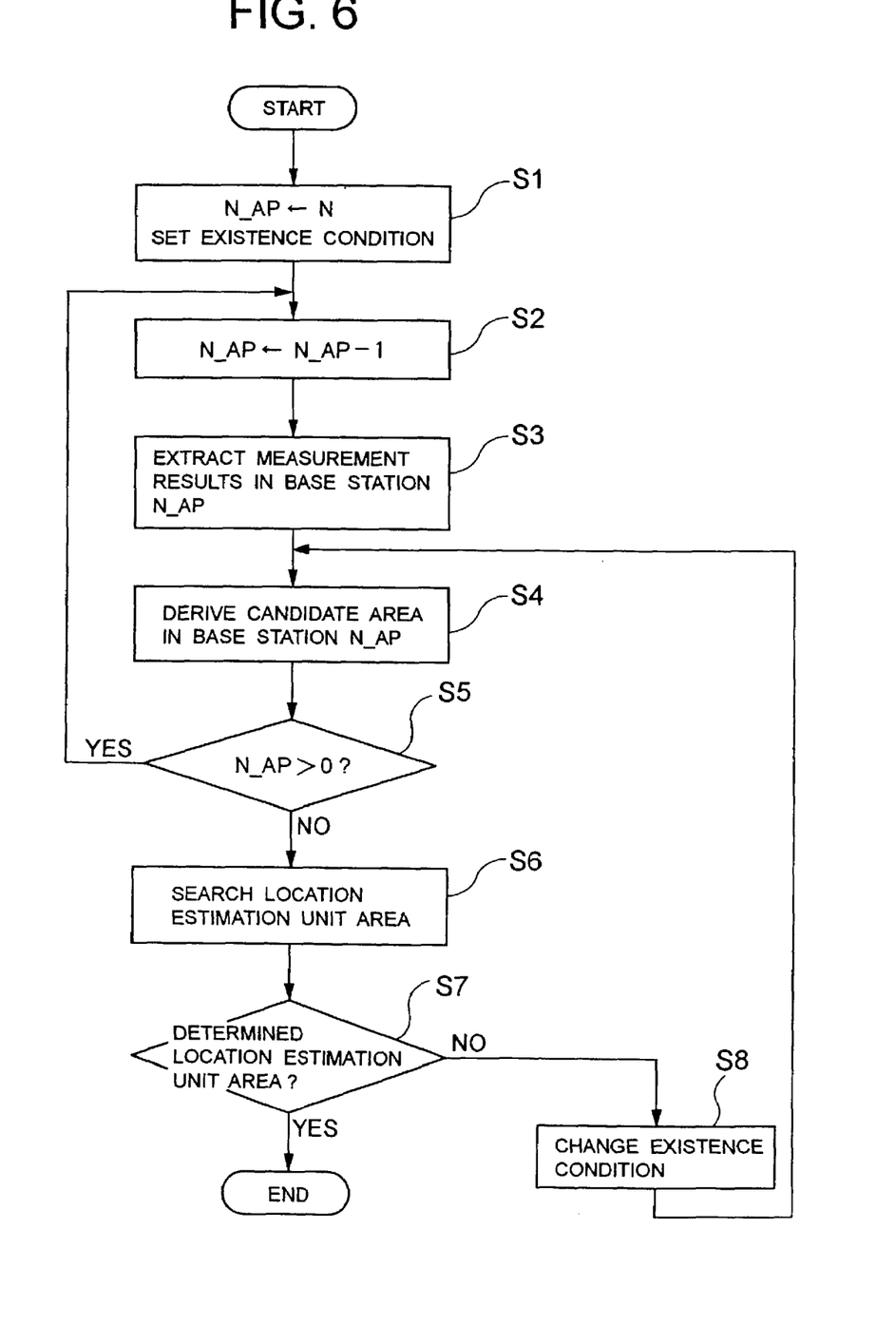
FIG. 6 is a flowchart showing an operation example of the location estimation unit area estimating portion shown in FIG. 4.
Figure 7:
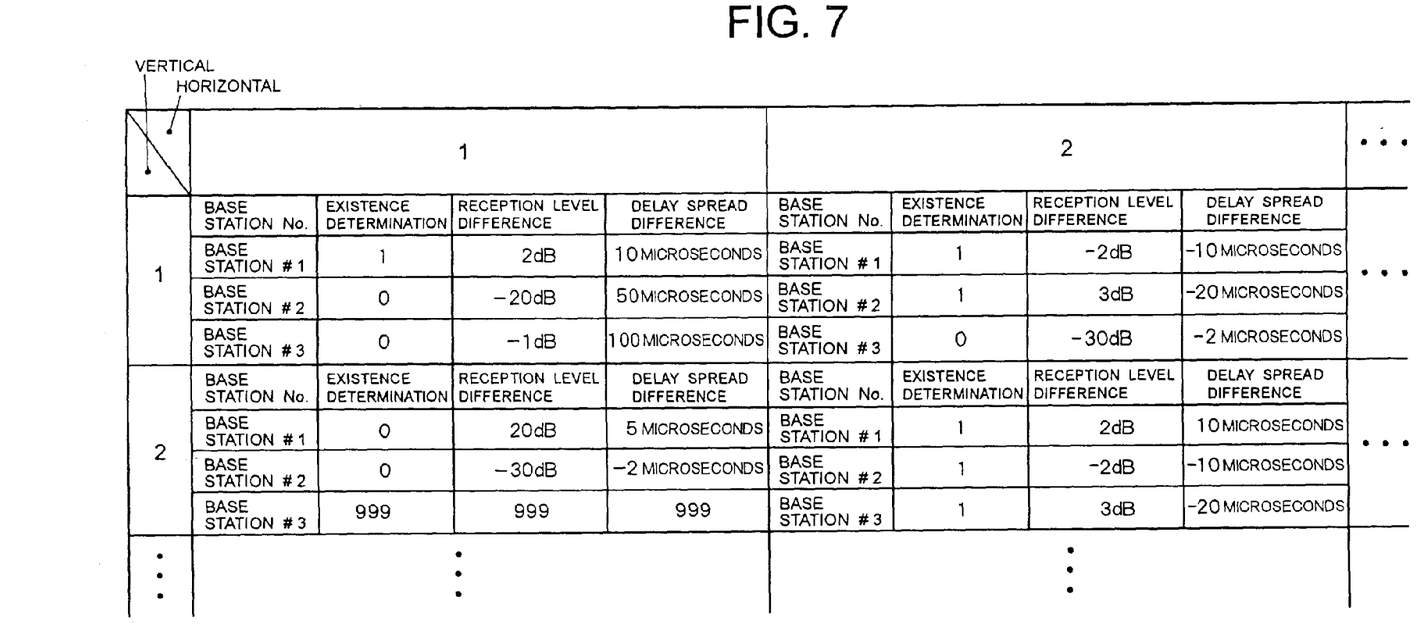
FIG. 7 is a diagram showing a configuration example of a processing table to be used in the location estimation unit area estimating portion shown in FIG. 4.

FIG. 6 is a flowchart showing an operation example of the location estimation unit area estimating portion 16 in FIG. 4, and FIG. 7 is a diagram showing the configuration example of a processing table to be used in the location estimation unit area estimating portion 16 in FIG. 4. Operation of estimating the location of the terminal 4 by the location estimation unit area estimating portion 16 will be described by referring to these FIGS. 1 to 7.

First, the location estimation unit area estimating portion 16 assigns the number of base stations to be considered to a variable N_AP, and also sets a condition for determining that the terminal 4 exists (existence condition) (step S1 in FIG. 6 (initialization step)). Here, the existence condition is the condition for estimating which location estimation unit area the terminal 4 exists in, and it uses a difference between data stored in the estimation result database 15 and the measurement results for instance.

To be more specific, the condition for the terminal 4 to exist in one location estimation unit area (i, j) is set as follows. The absolute value of the difference between the reception level (see FIG. 5) in the location estimation unit area (i, j) and the reception level of the measurement results is within 3 dB, and the absolute value of the difference between the delay spread (see FIG. 5) in the location estimation unit area (i, j) and the delay spread of the measurement results is within 20 microseconds.

Subsequently, the location estimation unit area estimating portion 16 subtracts 1 from N_AP, and sets the base station to be evaluated (step S2 in FIG. 6 (base station update step)), and prepares to evaluate the existence condition based on the measurement results of the set base station and the estimation results in each location estimation unit area (step S3 in FIG. 6 (1 base station measurement result extraction step)).

Thereafter, the location estimation unit area estimating portion 16 evaluates the existence condition, and extracts the location estimation unit area(s) in which the terminal 4 may exist (step S4 in FIG. 6 (1 base station candidate area derivation step)).

If N_AP is larger than "0" (step S5 in FIG. 6 (base station evaluation completion determination step), YES), there exists a base station not evaluated, and so the location estimation unit area estimating portion 16 returns to the base station update step (step S2 in FIG. 6). If N_AP is "0" (step S5 in FIG. 6, NO), it means that all the base stations have been evaluated, and so it proceeds to the next step.

In the base station evaluation completion determination step (step S5 in FIG. 6), the location estimation unit area estimating portion 16 generates the table as shown in FIG. 7 immediately before proceeding to the next step. While this table shows a case where the number of the base stations is 3, it may be extended to the cases where the number of the base stations is different.

The table shown in FIG. 7 indicates each location estimation unit area with vertical and horizontal numbers. The location estimation unit area estimating portion 16 extracts the reception level and the delay spread in each location estimation unit area of the radio wave transmitted from each of the base stations #1 to #3 from the table shown in FIG. 5 stored in the estimation result database 15, and acquires the differences between the extracted estimation results and the measurement results of each of the base stations #1 to #3 (step S3 in FIG. 6 (1 base station measurement result extraction step)).

The location estimation unit area estimating portion 16 evaluates whether or not the terminal 4 exists in each location estimation unit area seen from each of the base stations #1 to #3 based on the obtained results and the existence condition, so as to input "1" in an existence determination line in the case where it may exist and input "0" therein in the case where it does not exist (step S4 in FIG. 6 (1 base station candidate area derivation step)). In the table shown in FIG. 7, the location estimation unit area estimating portion 16 assigns "999" to indicate that it is unmeasurable in the case where, for instance, the terminal 4 is too far from the base station #3 to have the radio waves reach there.

In FIG. 7, the location estimation unit area identified by (vertical=1, horizontal=1) has the "base station #1" (existence determination "1," reception level difference "2 dB," delay spread difference "10 microseconds"), "base station #2" (existence determination "0," reception level difference "−20 dB," delay spread difference "50 microseconds") and "base station #3" (existence determination "0," reception level difference "−1 dB," delay spread difference "100 microseconds"), stored therein.

The location estimation unit area identified by (vertical=1, horizontal=2) has the "base station #1" (existence determination "1," reception level difference "−2 dB," delay spread difference "−10 microseconds"), "base station #2" (existence determination "1," reception level difference "3 dB," delay spread difference "−20 microseconds") and "base station #3" (existence determination "0," reception level difference "−30 dB," delay spread difference "−2 microseconds"), stored therein.

The location estimation unit area identified by (vertical=2, horizontal=1) has the "base station #1" (existence determination "0," reception level difference "20 dB," delay spread difference "5 microseconds"), "base station #2" (existence determination "0," reception level difference "−30 dB," delay spread difference "−2 microseconds") and "base station #3" (existence determination "999," reception level difference "999," delay spread difference "999"), stored therein.

The location estimation unit area identified by (vertical=2, horizontal=2) has the "base station #1" (existence determination "1," reception level difference "2 dB," delay spread difference "10 microseconds"), "base station #2" (existence determination "1," reception level difference "−2 dB," delay spread difference "−10 microseconds") and "base station #3" (existence determination "1," reception level difference "3 dB," delay spread difference "−20 microseconds"), stored therein.

The location estimation unit area estimating portion 16 detects the location estimation unit area in which "1" is assigned to the existence determination lines for all the base stations #1 to #3 [in the case of FIG. 7, the location estimation unit area identified by (vertical=2, horizontal=2)] (step S6 in FIG. 6 (location estimation unit area search step)).

Furthermore, the location estimation unit area estimating portion 16 determines whether or not to change the existence condition based on the number of the detected location estimation unit areas (step S7 in FIG. 6 (location estimation completion determination step)). The change in the existence condition is implemented, for instance, by changing it to be more strict in the case where a large number of the location estimation unit areas in which the terminal 4 may exist are detected, and changing it to be less strict in the case where no location estimation unit areas in which the terminal 4 may exist is detected. If the number of the detected location estimation unit areas in which the terminal 4 may exist is as required and sufficient, this flow is finished and the portion 16 outputs the detected location estimation unit area(s).

On determining that the existence condition is to be changed, the location estimation unit area estimating portion 16 performs the change in the existence condition as above (step S8 in FIG. 6 (existence determination condition update step)), and returns to the 1 base station candidate area derivation step (step S4 in FIG. 6).

Figure 8:
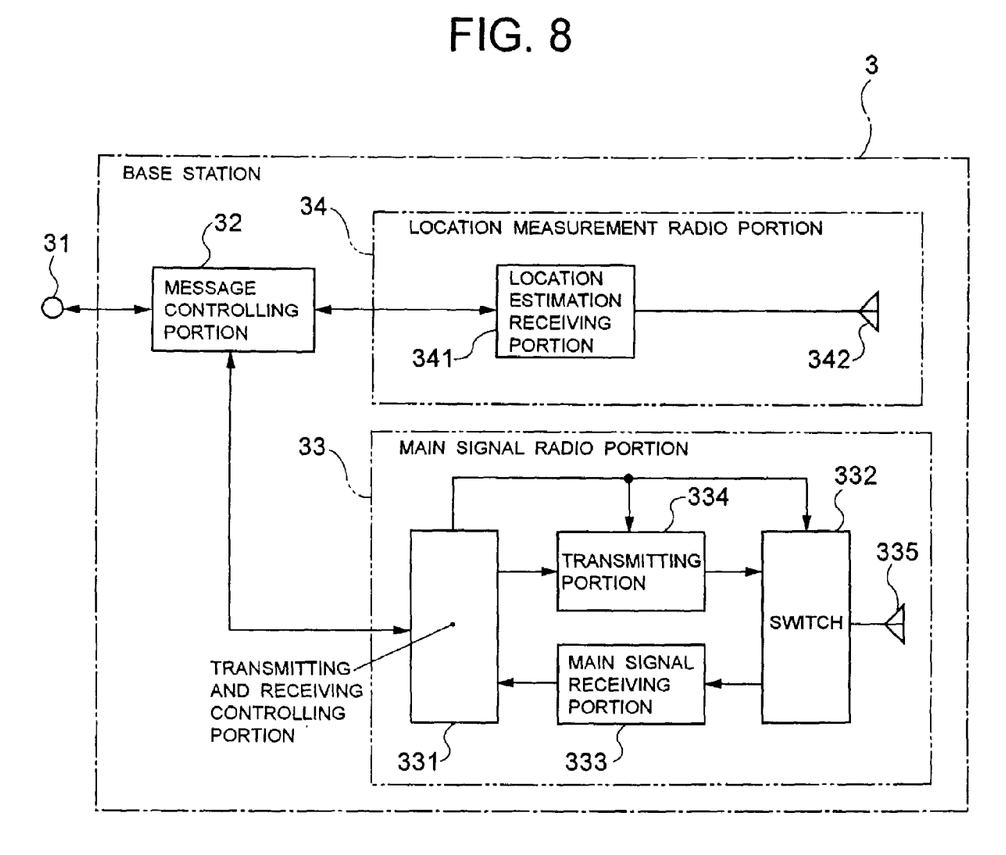
FIG. 8 is a block diagram showing a configuration example of the base station shown in FIG. 1.

FIG. 8 is a block diagram showing a configuration example of each of the base stations 3-1 to 3—3 in FIG. 1. In FIG. 8, reference numeral 31 denotes an input-output terminal, 32 denotes a message controlling portion, 33 denotes a main signal radio portion, 331 denotes a transmitting and receiving controlling portion, 333 denotes a main signal receiving portion, 334 denotes a transmitting portion, 332 denotes a switch, 335 denotes a transmitting and receiving antenna, 34 denotes a location measurement radio portion, 341 denotes a location estimation receiving portion, and 342 denotes a receiving antenna respectively. In FIG. 8, each of the base stations 3-1 to 3—3 is the base station 3.

The input-output terminal 31 is connected to the Internet 100, and exchanges packets with the positioning server 1 and the content server 2. The message controlling portion 32 converts a format for relaying between a radio communication system and a wire communication system (the Internet 100), analyzes a message from the input-output terminal 31, and adequately starts the main signal radio portion 33 and the location measurement radio portion 34. The transmitting and receiving controlling portion 331 controls the transmitting portion 334 and performs retransmitting control of the radio communication system. As for radio systems of the base station 3, the station 3 has two systems of the location measurement radio portion 34 and the main signal radio portion 33.

The location measurement radio portion 34 is comprised of the location estimation receiving portion 341 and the receiving antenna 342, and receives the location information response message transmitted from the terminal 4 based on settings from the message controlling portion 32 and measures the received signal level, delay spread and so on which are the parameters showing the radio wave propagation environment (radio wave propagation characteristics) so as to output them to the message controlling portion 32 as the measurement results.

On the other hand, the main signal radio portion 33 is comprised of the transmitting and receiving controlling portion 331, the transmitting portion 334, the main signal receiving portion 333, the switch 332 and the transmitting and receiving antenna 335, and relays the packets such as user data between the terminal 4 connected to the base station 3 and the Internet 100.

On having the packet to the terminal 4 inputted from the input-output terminal 31, the message controlling portion 32 outputs it to the transmitting and receiving controlling portion 331. The transmitting and receiving controlling portion 331 notifies the transmitting portion 334 and the switch 332 that there is the transmitting packet and prepares for transmitting, and then transmits the packet via the transmitting portion 334, switch 332 and antenna 335. The switch 332 normally has the main signal receiving portion 333 and the antenna 335 connected thereto.

On the other hand, the packet transmitted from the terminal 4 is received by the transmitting and receiving controlling portion 331 via the antenna 335, switch 332 and main signal receiving portion 333. Furthermore, this packet is transferred to the Internet 100 via the message controlling portion 32 and input-output terminal 31.

The operation of the base station 3 will be described by using FIG. 3. The location-related information request message B1 transmitted from the terminal 4 is received by the base station 3 to which the terminal 4 is connected. The message B1 is supplied to the transmitting and receiving controlling portion 331 via the antenna 335, switch 332 and main signal receiving portion 333.

The transmitting and receiving controlling portion 331 performs retransmitting control for a transmission error in the message B1, and transfers the correctly received message B1 to the message controlling portion 32. The message controlling portion 32 converts the format of the message B1 into the format used on the Internet 100, and then sends it to the content server 2 via the input-output terminal 31.

The measurement request message B3, B4, B5 sent from the positioning server 1 is received by the message controlling portion 32 via the input-output terminal 31. The message controlling portion 32 analyzes this message, and sets a frequency in the location measurement radio portion 34 so that it can receive the location information response message B7 transmitted from the terminal identified by the terminal ID (the terminal 4 in this example).

The location information probe message B6 sent from the positioning server 1 to the terminal 4 is transferred to the base station 3 to which the terminal 4 is connected, and then is transferred to the terminal 4 via the input-output terminal 31, message controlling portion 32, transmitting and receiving controlling portion 331, transmitting portion 334, switch 332 and antenna 335.

The location information response message B7 transmitted as the broadcast message from the terminal 4 is received by the location estimation receiving portion 341. The location estimation receiving portion 341 measures the parameters showing the propagation environment for estimating the location of the terminal 4, and transfers them to the message controlling portion 32. The message controlling portion 32 transfers the inputted parameters as the measurement result message B8, B9, B10 to the positioning server 1.

The information providing message B13 sent from the content server 2 is transferred to the base station 3 to which the terminal 4 is connected, and then is transferred to the terminal 4 on the same route as the location information probe message B6.

The location estimation receiving portion 341 estimates the parameters such as the received signal level and the delay spread obtained from the channel impulse response based on the location information response message B7 transmitted from the terminal 4. For this estimation, a preamble signal added to the radio packet may be used for instance. With the preamble signal, the portion 341 measures the received signal level and estimates the channel impulse response for the sake of setting of an equalizer for equalizing a distortion due to multi-path phasing in order to correctly demodulate the packet. The parameters for estimating the location is extracted based on these results.

Thus, it is possible, by not using an external apparatus such as a GPS, to accurately estimate the location of the terminal 4 based on the radio wave propagation environment measured from the signal transmitted from the terminal 4 and provide the information services in keeping with the location of the terminal 4.

In addition, the positioning server 1 has the radio wave propagation estimating portion 14 which stores the estimation results in the estimation result database 15 according to change in structures in the service area A and so on, so that it can promptly cope with addition of a new base station, the change in structures and so on.

Furthermore, as the base station 3 has the radio system for detecting the location (the location measurement radio portion 34), it is possible to accurately estimate the location of the terminal 4 without having an impact on the terminal 4 connected thereto.

As described above, according to the present invention, it is possible to accurately estimate the location of the terminal without adding an additional apparatus thereto and provide the information services according to the terminal location easily and accurately.

What is claimed is:

1. A positioning system having:
   a positioning server for estimating a location of a mobile terminal in a service area comprised of a plurality of preset areas; and
   a plurality of base stations connectable to said terminal via radio links and connected to said positioning server via a network, wherein:
      each of said base stations has receiving means for receiving a signal transmitted from said terminal, measuring means for measuring a radio wave propagation environment between said terminal and the base station from the signal received by said receiving means, and means for sending the measurement result of said measuring means to said positioning server;
      said positioning server has storing means for storing a estimation result of the radio wave propagation environment between each of said preset areas and each of said base stations, and estimating means for estimating the location of said terminal by checking said estimation results stored in said storing means against said measurement results from said base stations; and
      said positioning server further has estimating means for estimating the radio wave propagation environment between each of said preset areas and each of said base stations based on at least the location of each of said base stations and placement of structures in said service area.

2. A positioning server connected via a network to a plurality of base stations connectable to a mobile terminal via radio links for estimating a location of said terminal in a service area comprised of a plurality of preset areas, wherein:
   said positioning server has storing means for storing a estimation result of a radio wave propagation environment between each of said preset areas and each of said base stations, and estimating means for estimating the location of said terminal by checking said estimation results stored in said storing means against the radio wave propagation environment between said terminal and each of said base stations measured by each of said base stations; and
   said positioning server further has estimating means for estimating the radio wave propagation environment between each of said preset areas and each of said base stations based on at least the location of each of said base stations and placement of structures in said service area.

3. A terminal location estimation method of a positioning system having a positioning server for estimating a location of a mobile terminal in a service area comprised of a plurality of preset areas, and a plurality of base stations connectable to said terminal via radio links and connected to said positioning server via a network, wherein:
   in each of said base stations measuring a radio wave propagation environment between said terminal and the base station based on a received signal from said terminal according to a request from said terminal and sending the measurement result to said positioning server;
   in said positioning server estimating the location of said terminal by checking estimation results stored in storing means for storing the estimation result of the radio wave propagation environment between each of said preset areas and each of said base stations against said measurement results from said base stations; and
   in said positioning server further estimating the radio wave propagation environment between each of said preset areas and each of said base stations based on at least the location of each of said base stations and placement of structures in said service area.

4. A terminal location estimation method of a positioning system having a positioning server for estimating a location of a mobile terminal in a service area comprised of a plurality of preset areas, and a plurality of base stations connectable to said terminal via radio links and connected to said positioning server via a network, wherein:
   each of said base stations has a step of measuring a radio wave propagation environment between said terminal and the base station based on a received signal from said terminal according to a request from said terminal and sending the measurement result to said positioning server;
   said positioning server has an estimating step of estimating the location of said terminal by checking estimation results stored in storing means for storing the estimation result of the radio wave propagation environment between each of said preset areas and each of said base stations against said measurement results from said base stations;
   said estimating step estimates which of said preset areas said terminal exists in based on results of checking said estimation results against said measurement results; and
   said estimating step estimates which of said preset areas said terminal exists in by further evaluating whether or not each of said results of checking meets an existence condition set on initialization.

5. The terminal location estimation method according to claim 4, wherein a difference between said estimation result and said measurement result is used for checking against said existence condition.

6. A positioning system having:
   a positioning server for estimating a location of a mobile terminal in a service area comprised of a plurality of preset areas; and
   a plurality of base stations connectable to said mobile terminal via radio links and connected to said positioning server via a network, wherein:
      each base station of said plurality of base stations has receiving means for receiving a signal transmitted from said mobile terminal, measuring means for measuring both an amplitude and a delay spread of the signal received by said receiving means without using a GPS device, and means for sending the measurement results of said measuring means to said positioning server; and
      said positioning server has storing means for storing estimated amplitudes and estimated delay spreads of a signal transmitted from within each preset area of said plurality of preset areas and received at said each base station, and estimating means for estimating the location of said mobile terminal by checking said estimated amplitudes and estimated delay spreads stored in said storing means against said measurement results sent by said each base station;

wherein said positioning server further has estimating means for estimating a radio wave propagation environment between said each preset area and said each base station based on at least the location of said each base station and placement of structures in said service area.

7. A positioning system having:
   a positioning server for estimating a location of a mobile terminal in a service area comprised of a plurality of preset areas; and
   a plurality of base stations connectable to said mobile terminal via radio links and connected to said positioning server via a network, wherein:
   each base station of said plurality of base stations has receiving means for receiving a signal transmitted from said mobile terminal, measuring means for measuring both an amplitude and a delay spread of the signal received by said receiving means without using a GPS device, and means for sending the measurement results of said measuring means to said positioning server; and
   said positioning server has storing means for storing estimated amplitudes and estimated delay spreads of a signal transmitted from within each preset area of said plurality of preset areas and received at said each base station, and estimating means for estimating the location of said mobile terminal by checking said estimated amplitudes and estimated delay spreads stored in said storing means against said measurement results sent by said each base station;

wherein said estimating means estimates the location of said mobile terminal by further evaluating whether or not results of said checking meet an existence condition set on initialization.

8. The positioning system according to claim 7, wherein a difference between one of said estimated amplitudes and a corresponding measured amplitude of said measurement results and a difference between one of said estimated delay spreads and a corresponding measured delay spread of said measurement results are used for checking against said existence condition.

9. A terminal location estimation method for estimating a location of a mobile terminal in a service area comprised of a plurality of preset areas, said method comprising steps of:
   receiving at each base station of a plurality of base stations a signal transmitted from said mobile terminal;
   measuring at said each base station, without utilizing a GPS device, both an amplitude and a delay spread of said received signal;
   sending by said each base station the measurement results to a positioning server;
   storing at said positioning server estimated amplitudes and estimated delay spreads of a signal transmitted from within each preset area of said plurality of preset areas and received at said each base station;
   receiving at said positioning server said measurement results from said each base station; and
   estimating at said positioning server the location of said mobile terminal by checking said stored estimated amplitudes and estimated delay spreads against said received measurement results;

wherein said positioning server estimates the location of said mobile terminal by further estimating a radio wave propagation environment between said each preset area and said each base station based on at least the location of said each base station and placement of structures in said service area.

10. A terminal location estimation method for estimating a location of a mobile terminal in a service area comprised of a plurality of preset areas, said method comprising steps of:
   receiving at each base station of a plurality of base stations a signal transmitted from said mobile terminal;
   measuring at said each base station, without utilizing a GPS device, both an amplitude and a delay spread of said received signal;
   sending by said each base station the measurement results to a positioning server;
   storing at said positioning server estimated amplitudes and estimated delay spreads of a signal transmitted from within each preset area of said plurality of preset areas and received at said each base station;
   receiving at said positioning server said measurement results from said each base station; and
   estimating at said positioning server the location of said mobile terminal by checking said stored estimated amplitudes and estimated delay spreads against said received measurement results;

wherein said positioning server estimates the location of said mobile terminal by further evaluating whether or not results of said checking meet an existence condition set on initialization.

11. The terminal location estimation method according to claim 10, wherein a difference between one of said estimated amplitudes and a corresponding measured amplitude of said measurement results and a difference between one of said estimated delay spreads and a corresponding measured delay spread of said measurement results are used for checking against said existence condition.

* * * * *